United States Patent [19]
Breitling

[11] Patent Number: 6,084,369
[45] Date of Patent: Jul. 4, 2000

[54] INCREMENTAL TRAVEL ENCODER

[75] Inventor: Wolfram Breitling, Sachsenheim, Germany

[73] Assignee: Robert Bosch GmbH, Stuttgart, Germany

[21] Appl. No.: 08/992,957

[22] Filed: Dec. 18, 1997

[30] Foreign Application Priority Data

Dec. 18, 1996 [DE] Germany .............................. 196 52 619

[51] Int. Cl.⁷ ................................ H01H 3/08; H01H 3/42
[52] U.S. Cl. ........................... 318/549; 318/558; 200/574
[58] Field of Search ................................... 318/602, 603, 318/543, 549, 558; 200/30 R, 52 R, 61.39, 61.76, 573, 574

[56] References Cited

U.S. PATENT DOCUMENTS

| | | | |
|---|---|---|---|
| 2,476,673 | 7/1949 | May et al. .............................. | 318/602 |
| 2,899,673 | 8/1959 | Reiner ..................................... | 318/602 |
| 3,256,473 | 6/1966 | Simopoulos et al. .................... | 318/602 |
| 4,052,675 | 10/1977 | Valdettaro ............................... | 325/465 |
| 4,379,245 | 4/1983 | Goldstein ................................ | 310/319 |

FOREIGN PATENT DOCUMENTS

35 10 651 A1   9/1985   Germany .

*Primary Examiner*—Bentsu Ro
*Attorney, Agent, or Firm*—Ronald E. Greigg; Edwin E. Greigg

[57] ABSTRACT

An incremental travel encoder with an encoder part (11) and a sensor part for the sake of its economical production as a set-point value controller for operator equipment in motor vehicles, such as climate control systems, the sensor part has at least one electric switch with one fixed and one movable switch element for opening and closing a circuit for generating counting pulses, and the encoder part has a plurality of indexing members, which are disposed one after the other at the interval of an increment in the direction of motion of the encoder part. Upon each increment of the encoder part, one of the successive indexing members actuates the movable switch element in the direction of a temporary opening or closure of the electric switch.

23 Claims, 5 Drawing Sheets

INCREMENTAL TRAVEL ENCODER

BACKGROUND OF THE INVENTION

The invention relates to an incremental travel encoder.

In a known travel encoder of this type for rotary angle measurement in open- and closed-loop control technology (German Patent Disclosure DE 35 10 651 A1), the encoder part embodied as an incremental wheel is located with a broken circumferential structure (toothing) contactlessly facing the sensor part at a distance, and the sensor part reacts to the structural change of the encoder part by changing its output voltage. The phase-displaced output signals of the sensor part make it possible both to count the rotary increments of the travel encoder and to indicate the direction of the rotation.

Modern operator equipment in motor vehicles is increasingly equipped with microprocessors, function LEDs, and LCDs. With the LEDs and LCDs, set-point value settings are indicated; for instance in a climate control system, the fan setting is indicated by an LED wedge and the temperature set point or air distribution setting is indicated by LCD information. By the display via LEDs or LCDs, a separation is obtained between the set-point value controller and the set-point value display; this now makes it possible to use incremental encoders as set-point value controllers, which are suitable for direct triggering of the microprocessors.

OBJECT AND SUMMARY OF THE INVENTION

The incremental travel encoder has the advantage of being inexpensive to produce and of meeting all the demands made of a set-point value controller for adjusting operator equipment in motor vehicles. The switch contact actuated by indexing members of the encoder part indicates both the number of increments and the direction of rotation. The evaluation circuit for converting the incremental number into a set-point value and a set-point value display is not complicated. The incremental encoder according to the invention exhibits an extraordinarily advantageous detent behavior for adjusting purposes, and the microdetent action is attainable without additional expenditure for components, or in other words is implicit in the incremental encoder itself. The incremental encoder comprises only a few plastic injection molded parts, is largely wear-proof and can be compact in design, so that it easily meets the demands for miniaturization and economy of material. Depending on the application, the incremental encoder can be embodied as a closer or an opener, and its counting pulses can be represented as voltage pulses or voltage intervals [gaps between pulses].

By the provisions recited herein advantageous further refinements and improvements to the incremental travel encoder disclosed are possible.

In accordance with a preferred embodiment of the invention, the encoder part is movable in two directions opposite one another, and that the sensor part has two electric switches, each assigned to one direction of motion, whose movable switch elements are disposed in the path of motion of the encoder part in such a way that the indexing members on the encoder part in the one direction of motion of the encoder part actuate only the one switch, and in the inverse direction of motion of the encoder part only the other switch. With such an incremental encoder, a set-point value controller that meets all demands made of it can be achieved. Each switch defines the adjusting direction of the set-point value, or in other words an increase or decrease in the input set-point value, while the extent of the increase is determined by the number of times the one switch is actuated, and the extent of the decrease is determined by the number of times the other switch is actuated.

In accordance with an advantageous embodiment of the invention, the sensor part has a spring element, which carries or acts upon the movable switch element and is elastically deflectable crosswise to the direction of motion of the encoder part in order to close or open the electric switch. The indexing members on the encoder part are provided with deflection shoulders or chamfers, placed obliquely to the direction of motion of the encoder part, which cooperate with the spring element to deflect it crosswise to the direction of motion of the encoder part. In the case of inverse adjusting directions of the encoder part, then one electric switch is disposed on each side of the path of motion of the encoder part, and two parallel deflection shoulders are provided on each indexing member of the encoder part, which each on one end change over into a respective switch level parallel to the path of motion of the encoder part. By means of these structural provisions, the sensor part can easily be made with the electric switches and the encoder part with the indexing members. The encoder part may be embodied as a slide or as a control wheel rotatable about a pivot axis, and the indexing members may be disposed on the end face or on side faces, facing away from one another and whose surface normals extend crosswise to the direction of motion, of the slide or control wheel; the spring element deflected by the indexing members must then be oriented accordingly.

In an alternative embodiment of the invention, the sensor part has a spring element, which carries the movable switch element or acts upon the movable switch element and which on one end is spatially fixed and in the direction of motion of the encoder part is elastically deflectable to close or open the at least one electric switch. The indexing members on the encoder part are formed by teeth of a toothing into which the spring element protrudes with its free end. In the case of inverse adjusting directions of the encoder part, one electric switch is disposed upstream and another downstream of the spring element in terms of the direction of motion of the encoder part, and the teeth on the encoder part are embodied symmetrically, so that in each direction of motion of the encoder part, they deflect the spring element uniformly in one or the other direction. Once again, the encoder part may be embodied as a slide or as a rotating control wheel, and the toothing may be disposed on the face end or on one of the two side faces facing away from one another, pointing crosswise to the direction of motion of the encoder part, of the slide and control wheel.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
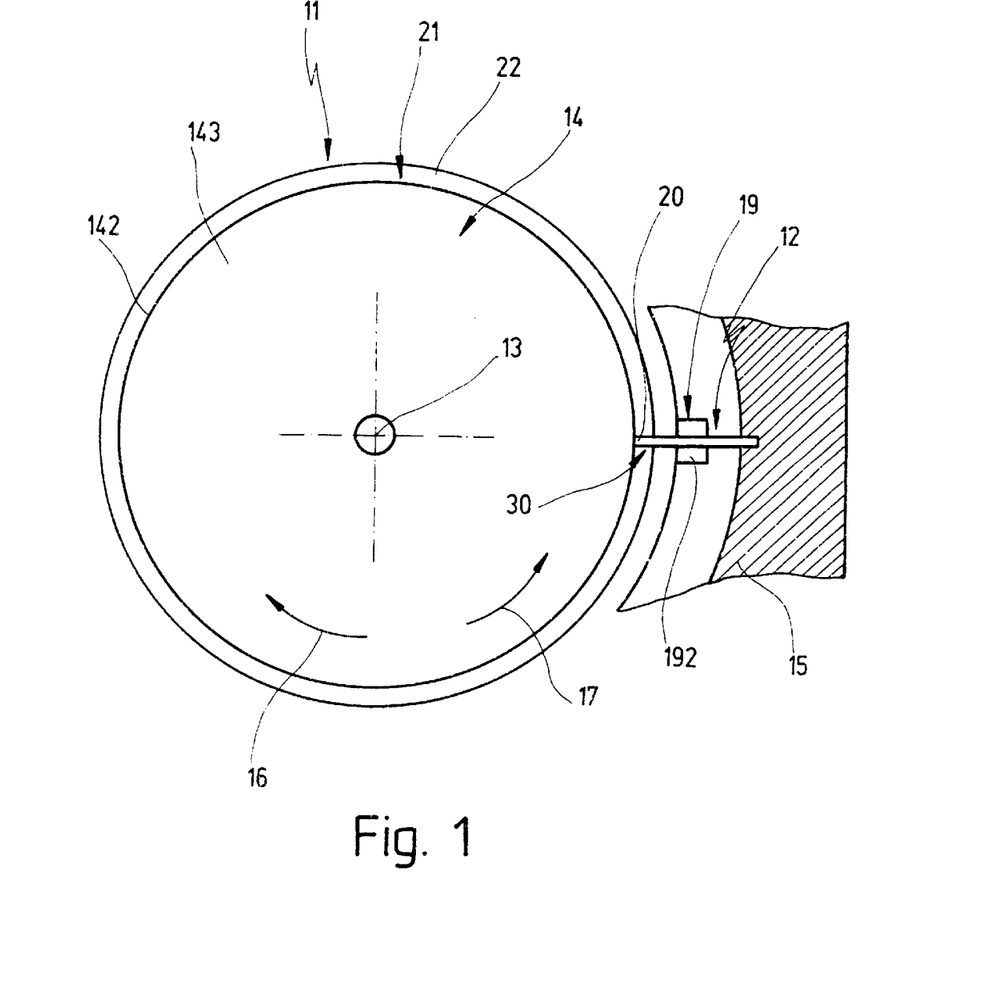
FIG. 1 is a schematic side view of an incremental travel encoder, partly in section.
Figure 2A:
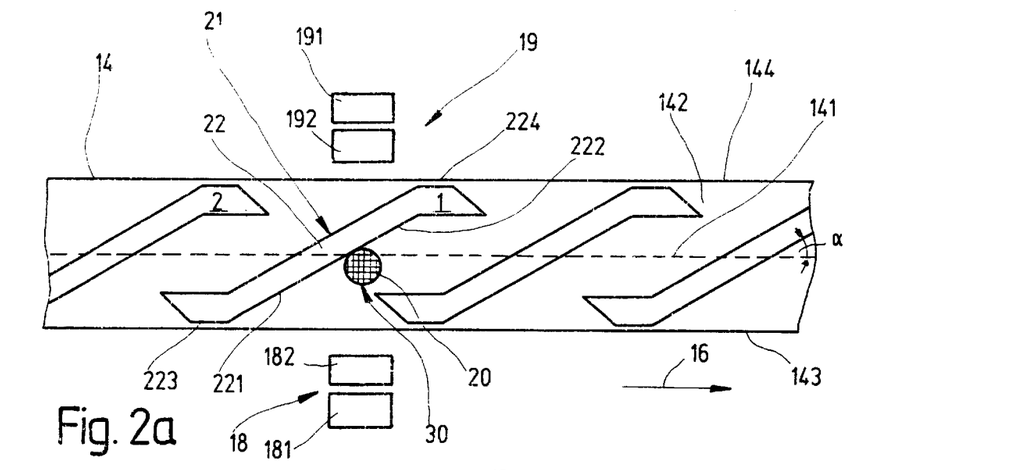
FIGS. 2a–2c are schematic fragmentary plan views on a developed view of the encoder part of the travel encoder in FIG. 1, in three successive motion increments with motion oriented to the right.
Figure 2B:
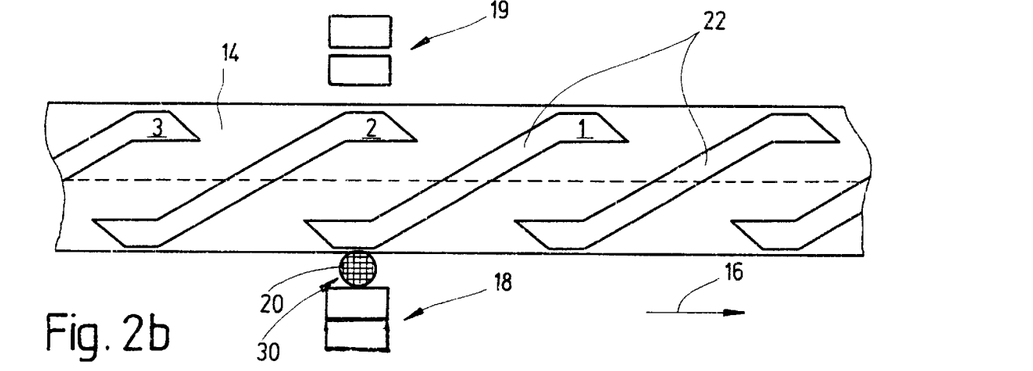
Figure 2C:
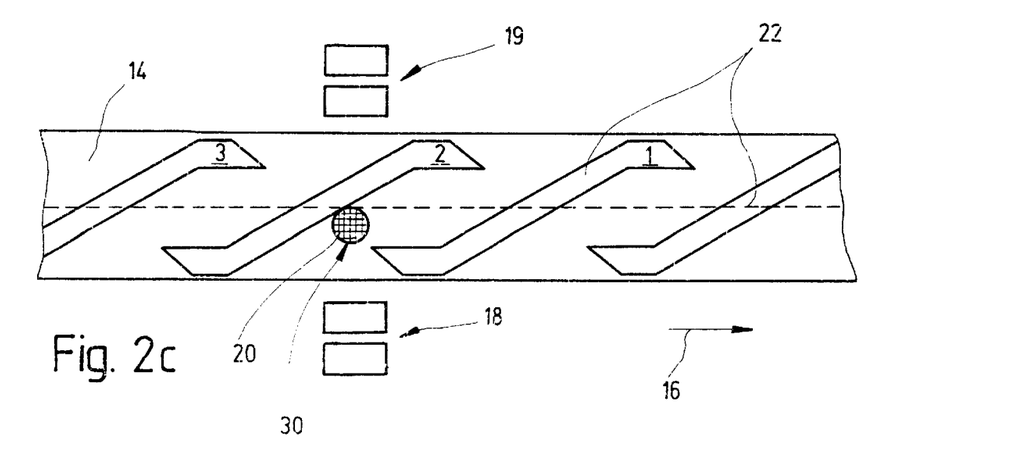
Figure 3A:
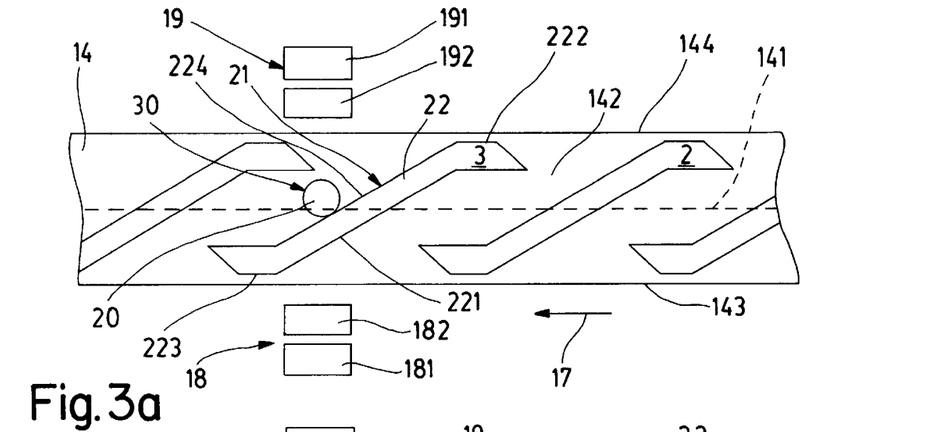
FIGS. 3a–3c are schematic fragmentary plan view on a developed view of the encoder part of the travel encoder in FIG. 1, in three successive motion increments with motion oriented inversely.
Figure 3B:
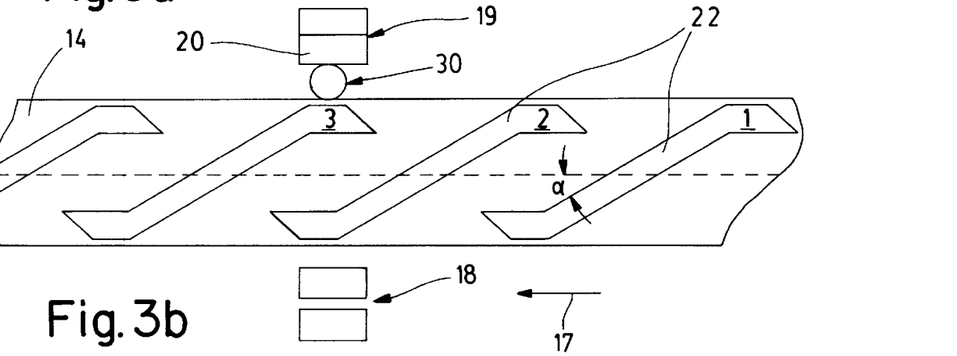
Figure 3C:
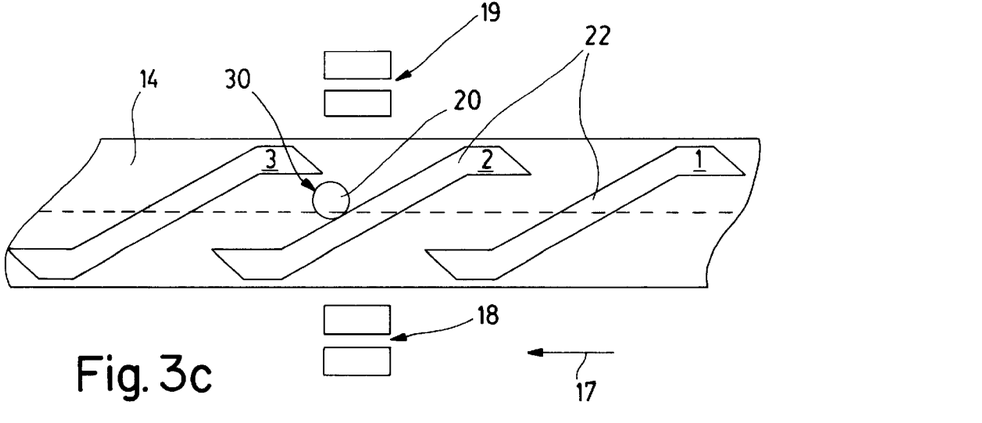

The incremental travel encoder shown schematically in a side view in FIG. 1 is used preferentially as a set-point value controller for operator equipment, for instance in a climate control system in motor vehicles, with which controller the air temperature in the vehicle interior, for instance, to be established by the climate control system is to be specified. The travel encoder has a movable encoder part 11, connected to a rotary knob, not shown, and the encoder part can be moved past a fixed sensor part 12; on each increment of the encoder part 11, the second part 12 outputs an electrical counting pulse. In the exemplary embodiment of FIG. 1, the encoder part 11 is embodied as a control wheel 14 that is rotatable about a pivot axis 13, is received in a housing indicated by reference numeral 15, and is connected to the rotary knob in a manner fixed against relative rotation for the sake of adjusting the set-point value. For each direction of rotation of the control wheel 14, which is indicated in FIG. 1 by the respective arrows 16 and 17, the sensor part 12 has one electric switch 18 and 19. The two switches 18, 19 are disposed one after the other on the circumference of the control wheel 14, parallel to the pivot axis 13 of the control wheel 14 and in mirror symmetry with the center plane or plane of symmetry 141 (FIGS. 2 and 3) of the control wheel 14. In FIG. 1, only the rear electric switch 19 can be seen, while the disposition of the two electric switches 18, 19 is shown in FIGS. 2 and 3. The electric switches 18, 19 are secured to the housing 15 and each have a respective fixed switch element 181 and 191 and a respective switch element 182 and 192 that is movable for closing an opening of the electric switch 18 and 19, respectively. Moreover, the sensor part 12 has a spring element 30, in the form of a resilient rod 20 fastened at one end to the housing 15. This rod is fastened radially to the control wheel 14 by its one end in such a way that with its other end, it can be deflected parallel to the pivot axis 13 of the control wheel 14, or in other words crosswise to the directions of rotation 16, 17 of the control wheel 14. The fastening of the resilient rod 20 is selected such that it is located in the plane of symmetry 141 of the control wheel 14, and any deflection in one or the other direction of rotation 16, 17 is largely prevented. The three-dimensional association of the resilient rod 20 and the switch contacts 18, 19 is selected such that the rod 20, on reaching its maximum deflection on one side of the control wheel 14, presses the movable switch element 182 against the fixed switch element 181, and upon reaching its maximum deflection on the other side of the control wheel 14, presses the movable switch element 192 against the fixed switch element 191. The movable switch element 182 or 192 is either movably secured to the housing 15 or held on a flexible carrier fastened to the housing 15. However, both switch elements 182, 192 may also be fixedly connected to the resilient rod 20. The two electric switches 18, 19 are disposed in the circuit of an evaluation circuit, not shown here, which each time the electric switch 18 closes outputs one counting pulse for the one direction of rotation 16 of the control wheel 14 and upon each closure of the switch 19 outputs one counting pulse for the other direction of rotation 17 of the control wheel 14. It is understood that it is also possible to design the evaluation circuit such that one such counting pulse is generated, for one or the other direction of rotation of the control wheel 14, each time the electric switches 18, 19 open. The counting pulse may be represented either as a voltage pulse or as a voltage gap in the output voltage of the sensor part 12.

The electric switches 18, 19 are actuated by indexing members 21, which are disposed one after the other on the control wheel 14, spaced apart by identical increment angles in the direction of motion of the control wheel 14. In the exemplary embodiment of FIGS. 1–3, the indexing members 21 are embodied as indexing protrusions 22 disposed on the circumferential face end 142 of the control wheel 14; these protrusions 22 are integrally formed on the control wheel 14. On each indexing protrusion 22, two deflection shoulders or chamfers 221, 222 (FIGS. 2 and 3) are formed, extending at a parallel spacing from one another, which are oriented, inclined at an acute angle a to the direction of motion of the indexing protrusions 22, upon rotation of the control wheel 14 in one of the two directions of rotation 16, 17. Each deflection chamfer 221, 222 ends terminally in a indexing plateau, which extends parallel to the direction of motion of the indexing members 21. The indexing plateau of the deflection chamfer 221 is identified by reference numeral 223, and the indexing plateau of the deflection chamfer 222 is identified by reference numeral 224 (FIGS. 2 and 3).

The mode of operation of the incremental encoder is shown schematically in FIGS. 2 and 3; in FIG. 2, a clockwise direction of rotation of the control wheel 14 is shown, indicated by the arrow 16 in FIG. 1, and in FIG. 3 a counterclockwise direction of rotation of the control wheel 14 is shown, as indicated by arrow 17 in FIG. 1. The resilient rod 20, which can be seen in cross section in FIGS. 2 and 3, is oriented radially to the control wheel 14 and ends at a slight radial spacing from the face end 142 of the control wheel 14 at the base of the indexing protrusions 22, so that the end of this rod is located between the indexing protrusions 22 and strikes one or the other of the deflection chamfers 221, 222 upon rotation of the control wheel 14, depending on the direction of rotation 16 or 17. Upon rotation of the control wheel 14 in the direction of the arrow 16, the resilient rod 20 is axially deflected by the deflection chamfer 221, as can be seen by comparing FIG. 2a with FIG. 2b. At the end of the deflection chamfer 221, the rod 20 runs up onto the indexing plateau 223 and presses the movable switch element 182 against the fixed switch element 181. The electric switch 18 is thus briefly closed (FIG. 2b). Upon further motion of the control wheel 14 in the direction of rotation indicated by arrow 16, the end of the rod 20 slips off the indexing plateau 223 again and returns resiliently to its outset position in the plane of symmetry of the control wheel 14, which is indicated in dot-dashed lines in FIGS. 2 and 3 and by reference numeral 141. There, the end of the rod presses against the deflection chamfer 221 of the next indexing protrusion 22 and is again deflected, upon further rotation of the control wheel 14 by one indexing increment, by the deflection chamfer 221 of this indexing protrusion 22 until it runs up onto the indexing plateau 223, where it again presses the movable switch element 182 against the fixed switch element 181 and thus closes the electric switch 18 again. As a result of the deflection and resilient return of the rod 30, a perceptible microdetent action results upon rotation of the control wheel 14, which makes sensitive set-point value adjustment possible.

Upon counterclockwise rotation of the control wheel 14 as indicated by the arrow 17 in FIG. 1, the resilient rod 20 is deflected by the deflection chamfers 222 at the indexing protrusions 22 toward the electric switch 19, so that when it runs up onto the indexing plateau 224, it presses the movable switch element 192 onto the fixed switch element 191 and thus closes the electric switch 19; this operation is tripped upon each rotary increment of the control wheel 14 by a successive indexing protrusion 22 in the direction of rotation 17. [that is, successive in terms of the direction of rotation] This process is illustrated in FIG. 3 in three different rotary positions of the control wheel 14 upon the execution of an indexing increment. In order to illustrate the displacement of the control wheel 14 in FIGS. 2a–2c and 3a–3c, three successive indexing struts 22 are identified by the numbers 1, 2 and 3. If the control wheel 14 in FIG. 2 rotates in the direction of the arrow 16, then these indexing protrusions 22 come to act in the order given upon the resilient rod 20. In the inverse direction of rotation indicated by arrow 13, shown in FIG. 3, the indexing protrusions 22 come into engagement with the rod 20 in reverse order.

In an alternative embodiment of the encoder part 11, the indexing members 21 are disposed, in the form of the indexing protrusions 22 with deflection chamfers 221 and 222 and indexing plateaus 223, 224, not on the face end 142 of the control wheel 14 but rather on one of the two side or disk faces 143, 144 (FIGS. 1, 2 and 3) of the control wheel 14 that are oriented at right angles to the pivot axis 13. The indexing protrusions 22 are disposed on a circular path concentric with the pivot axis 13, and the deflection chamfers 221 and 222 are oriented at an acute angle to the radial. The indexing plateaus 223 and 224 are curved and are located on an inner and an outer pitch circle, which circles are disposed concentrically to one another and to the pivot axis 13. The resilient rod 20 is oriented parallel to the pivot axis 13 and protrudes with its end in between the indexing protrusions 22 and ends at a slight axial spacing from the disk face 143 or 144 that carries the indexing members 21. In a developed view of the indexing protrusions 22 disposed one after the other on a circular path, the circular path would correspond to the dashed line marked 141 (FIGS. 2 and 3).

Figure 4:
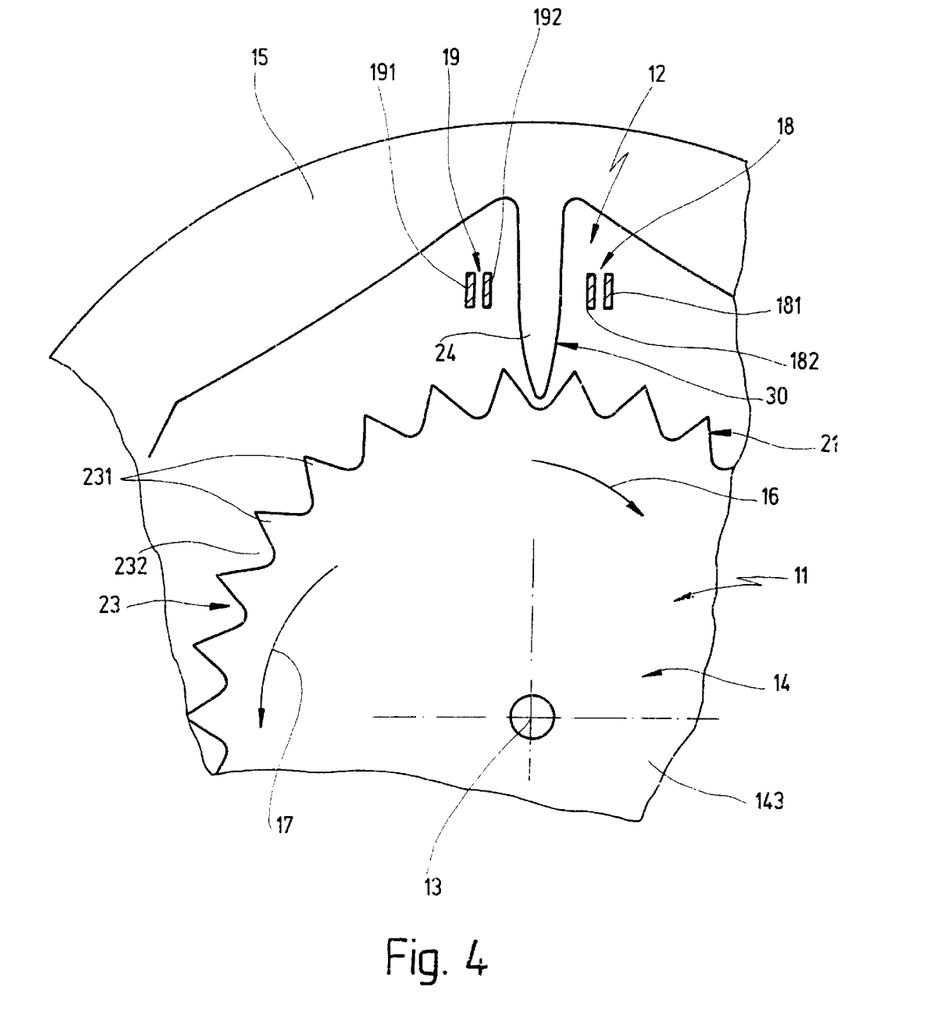
FIG. 4 schematically shows a detail of a side view of an incremental travel encoder in a second exemplary embodiment, partly in section.
Figure 5:
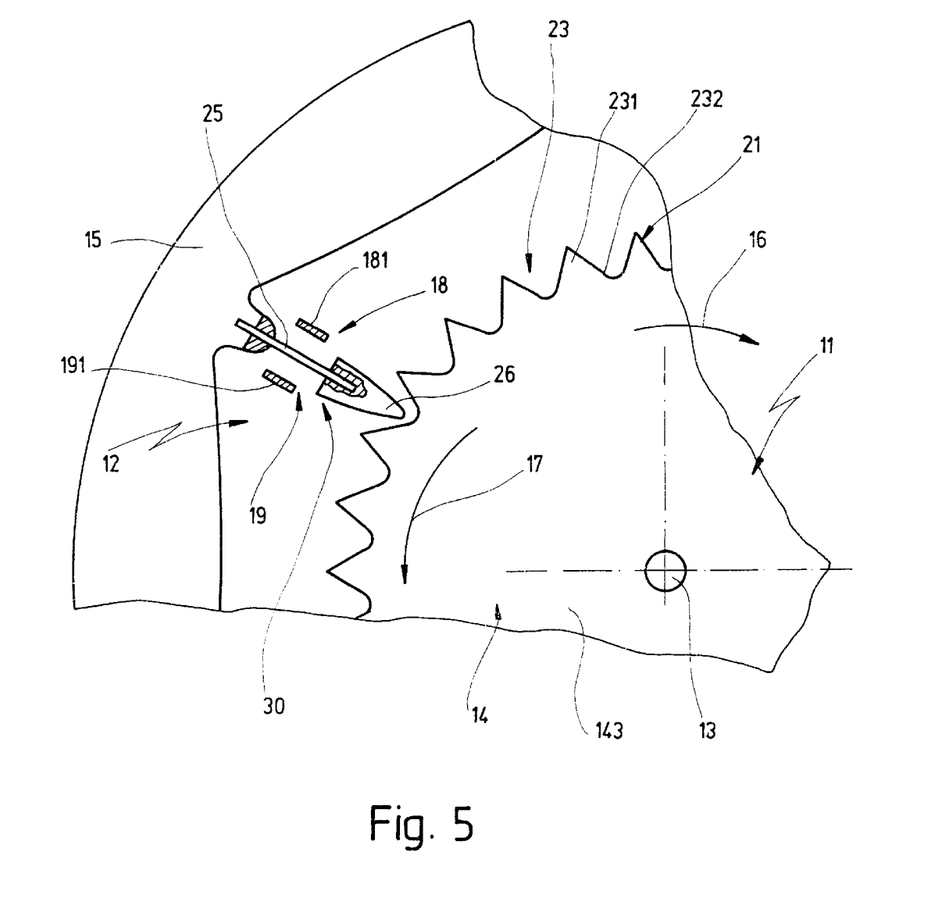
FIG. 5 is a view like that of FIG. 4 for an incremental travel encoder in accordance with a third exemplary embodiment.

In the further exemplary embodiments, shown in FIGS. 4 and 5, the encoder part 11 is again embodied as a control wheel 14 with indexing members 21, but unlike the incremental encoder of FIGS. 1–3, these are embodied here as teeth 231 of a spur toothing 23 formed on the face end 142 of the control wheel 14. In accordance with the two directions of rotation 16, 17 of the control wheel 14, the teeth 231 are embodied symmetrically, and thus have leading and trailing edges that are identical to one another. Again, in accordance with the two directions of rotation 16 and 17, there are two electric switches 18, 19 on the sensor part 12, each with one fixed switch element 181 and 191 and one movable switch element 182 and 192, which are spaced apart from one another in the circumferential direction of the control wheel 14 and are disposed with radial spacing from the end toothing 23 of the control wheel 14. A spring tongue 24 forming the spring element 30 protrudes in between the two electric switches 18, 19; the end of this tongue protrudes into a gap 232 between two successive teeth 231. The spring tongue 24 is oriented radially to the control wheel 14 and is fastened to the housing 15 or is formed at the same time of plastic in the injection molding of the housing 15. The spring tongue 24 is designed such that it can be deflected spring-elastically in the circumferential direction of the control wheel 14, while conversely twisting parallel to the pivot axis 13 is prevented. The disposition of the electric switches 18, 19 with respect to the spring tongue 24 is selected such that the spring tongue 24 is deflected by the individual teeth 231 of the spur toothing 24 far enough in each of the two directions of rotation 16, 17 that the spring tongue 24 presses against the movable switch element 182 or 192 and presses it against the fixed switch element 181 or 191, so that the respective electric switch 18 or 19 is briefly closed. Once the tooth 231 has rotated past and below the spring tongue 24, the spring tongue 24 springs back into the next successive tooth gap 32, opening the respective electric switch 18 or 19, and from there is deflected again by the next subsequent tooth 231. As in the exemplary embodiment of FIG. 3, once again the movable switch element 182 or 192 can either be movably secured to the housing 15 or secured rigidly to a flexible carrier fastened in the housing 15. It is also possible to secure the two movable switch elements 182, 192 on opposite sides of the spring tongue 24.

The incremental encoder shown in fragmentary form in FIG. 5 differs from the incremental encoder described in conjunction with FIG. 4 only in that the spring element 30 is formed by a spring blade 25 of electrically conductive material and takes over the function of the two movable switch elements 182 and 192 of the electric switches 18, 19. The spring blade 25 is fastened to the housing 15 in such a way that it can be deflected in the circumferential direction of the control wheel 14 by the teeth 231 of the spur toothing 23 and is connected to the current circuit of the evaluation circuit. On the end of the spring blade 25 toward the control wheel 14, a prong 26 of insulating material is slipped on, which protrudes into the tooth gap 232 of the spur toothing 23. The fixed switch elements 181 and 191 are disposed in the circumferential direction of the control wheel 14 at a spacing from the spring blade 25 such that upon deflection of the insulating prong 26 by a tooth 231 of the spur toothing 23, the spring blade 25 presses against the fixed switch element 181 or 191, depending on the direction of rotation 16 or 17 of the control wheel 14, and thus closes the respective electric switch 18 or 19.

In an alternative embodiment of the invention, the teeth for deflecting the spring element 30 are not embodied as a spur toothing but rather as a toothed ring, which is disposed concentrically to the pivot axis 13 on one of the two side or disk faces 143, 144 of the control wheel 14. The individual teeth of the toothed ring are oriented radially and protrude axially from the disk face 143 or 144. The spring element 30, which may again be embodied as an elastic spring tongue 24 or as a spring blade 25, is oriented parallel to the pivot axis 13 of the control wheel 14 and engages through the teeth in a toothed ring to deflect it in the direction of rotation 16 or the direction of rotation 17.

The invention is not limited to the exemplary embodiments described. For instance, the electric switches 18, 19 in FIGS. 4 and 5 may be embodied such that when they are not actuated, they are closed by the spring element 30. If then the control wheel is rotated onward by one rotational increment in one or the other direction of rotation 16 or 17, then either the movable switch element 182 firmly joined to the spring element 30 or the movable switch element 192 firmly joined to the spring element 30 lifts away from the respective associated fixed switch element 181 or 191, and the respective electric switch 18 or 19 is opened. In the exemplary embodiment of FIG. 4, to that end the two switch elements 181 and 182 and the two switch elements 191 and 192 would have to change places. In the exemplary embodiment of FIG. 5, the spring blade would have to be provided with two contact tongues, which when the spring element 30 is not actuated would each rest on the outside, remote from the spring blade 25, of the fixed switch elements 181 or 191. If the spring blade 25 is then deflected via the insulating prong 26 upon further rotation of the control wheel 14, for instance in the direction of rotation 16, then the contact tongue connected to the spring blade 25 will lift away from the fixed switch element 181, and the electric switch 18 is opened.

The encoder part 11 may also be embodied not only as a rotating control wheel 14 but also as an elongated slide, which carries the indexing members 21 in the same way as the control wheel 14 does.

The foregoing relates to preferred exemplary embodiments of the invention, it being understood that other variants and embodiments thereof are possible within the spirit and scope of the invention, the latter being defined by the appended claims.

I claim:

1. An incremental travel encoder comprising a movable encoder part (11) and a stationary sensor part (12), along which the encoder part (11) can be moved past in increments, and one electrical counting pulse can be picked up from each increment of the encoder part (11), in which the sensor part (12) has at least one electric switch (18, 19) with one fixed and one movable switch element (181, 191 and 182, 192), respectively for opening and closing a circuit for generating counting pulses; the encoder part (11) has a plurality of indexing members (21), which are disposed one after the other at the spacing of an increment in the direction of motion (16, 17) of the encoder part and upon each increment of the encoder part (11) actuates the movable switch element (182 or 192) in the sense of a temporary opening or closure of the electric switch (18, 19), the encoder part (11) is movable in two directions (16, 17) opposite one another, and that the sensor part (12) has two electric switches (18, 19), each assigned to one direction of motion (16 or 17), whose movable switch elements (182 or 192) are disposed in the path of motion (16, 17) of the encoder part (11) in such a way that the indexing members (21) on the encoder part (11) in the one direction of motion (16) of the encoder part (11) actuate only the one switch, and in an inverse direction of motion (17) of the encoder part (11) only the other switch (18, 19) is activated.

2. A travel encoder in accordance with claim 1, in which the sensor part (12) has a spring element (30), which carries the movable switch element (182 or 192) or acts upon the movable switch element (182 or 192) and which on one end is spatially fixed and crosswise to the direction of motion (16, 17) of the encoder part (11) is elastically deflectable to close or open the electric switch (18, 19), and that the indexing members (21) on the encoder part (11) are provided with a deflection chamfer (221 or 222), inclined relative to the direction of motion (16, 17) of the encoder part (11), which cooperate with the spring element (30) for its deflection.

3. The travel encoder in accordance with claim 2, in which on each side of the path of motion of the encoder part (11) there is one electric switch (18 and 19, respectively), and that each indexing member (21) on the encoder part (11) has two parallel deflection chamfers (21, 22), inclined relative to the direction of motion, each of which at one end changes over into a respective indexing plateau (223, 224) that is parallel to the direction of motion (16 or 17) of the encoder part (11).

4. A travel encoder in accordance with claim 2, in which the encoder part (11) is embodied as a control wheel (14) rotatable about a pivot axis (13); that the deflection chamfers (221, 222) are embodied with a indexing plateau (223, 224) on a face end (142) of the control wheel (14); and that the spring element (30) is oriented radially to the pivot axis (13) of the control wheel (14) and is embodied as deflectable in the direction of the pivot axis (13) of the control wheel (14).

5. A travel encoder in accordance with claim 4, in which the deflection chamfers (221, 222) with the indexing plateau (223, 224) are embodied on indexing protrusions (22), which are formed integrally on the control wheel (14).

6. The travel encoder in accordance with claim 1, in which on each side of the path of motion of the encoder part (11) there is one electric switch (18 and 19, respectively), and that each indexing member (21) on the encoder part (11) has two parallel deflection chamfers (21, 22), inclined relative to the direction of motion, each of which at one end changes over into a respective indexing plateau (223, 224) that is parallel to the direction of motion (16 or 17) of the encoder part (11).

7. The travel encoder in accordance with claim 6, in which the encoder part (11) is embodied as a control wheel (14) rotatable about a pivot axis (13); that the deflection chamfers (221, 222) are embodied with an indexing plateau (223, 224) are disposed along a circular path on one of the two disk faces (143, 144) of the control wheel (14); and that the spring element (30) is oriented parallel to the pivot axis (13) of the control wheel (14) and is embodied as deflectable in the circumferential direction of the control wheel (14).

8. A travel encoder in accordance with claim 1, in which the sensor part (12) has a spring element (30), which carries the movable switch element (182, 192) or acts upon the movable switch element (182, 192) and which on one end is spatially fixed and in the direction of motion of the encoder part (11) is elastically deflectable to close or open the electric switch (18, 19), and that the indexing members (21) on the encoder part (11) are formed by teeth (231) of a toothing (23) into which the spring element (30) protrudes with its free end.

9. A travel encoder in accordance with claim 8, in which the encoder part (11) is embodied as a control wheel (14), rotatable about a pivot axis (13), with spur toothing (23) disposed on its face end (142), and that the spring element (30) is oriented radially to the control wheel (14).

10. A travel encoder in accordance with claim 9, in which the spring element (30) comprises electrically conductive material and forms the movable switch element or elements themselves, and that a slide piece (26) protruding into the toothing (23) and comprising insulating material is mounted on the free end of the spring element (30).

11. A travel encoder in accordance with claim 8, in which upstream and downstream, in terms of the direction of motion (16, 17) of the encoder part (11), of the spring element (30), one electric switch (18, 19), is disposed, and that the teeth (231) of the toothing (23) are embodied symmetrically, with identical leading and trailing edges.

12. A travel encoder in accordance with claim 11, in which the encoder part (11) is embodied as a control wheel (14), rotatable about a pivot axis (13), with spur toothing (23) disposed on its face end (142), and that the spring element (30) is oriented radially to the control wheel (14).

13. A travel encoder in accordance with claim 11, in which the encoder part (11) is embodied as a control wheel (14); that the toothing is disposed as a tooth ring, coaxial to the pivot axis (13) of the control wheel (14), with axially protruding teeth on one of the plane disk faces (143, 144) of the control wheel (14), and that the spring element (30) is oriented parallel to the pivot axis (13) of the control wheel (14).

14. A travel encoder in accordance with claim 11, in which the spring element (30) comprises electrically conductive material and forms the movable switch element or elements themselves, and that a slide piece (26) protruding into the toothing (23) and comprising insulating material is mounted on the free end of the spring element (30).

15. An incremental travel encoder comprising a movable encoder part (11) and a stationary sensor part (12), along which the encoder part (11) can be moved past in increments, and one electrical counting pulse can be picked up from each increment of the encoder part (11), in which the sensor part (12) has at least one electric switch (18, 19) with one fixed and one movable switch element (181, 191 and 182, 192), respectively for opening and closing a circuit for generating counting pulses; the encoder part (11) has a plurality of indexing members (21), which are disposed one after the other at the spacing of an increment in the direction of motion (16, 17) of the encoder part and upon each increment of the encoder part (11) actuate the movable switch element (182 or 192) in the sense of a temporary opening or closure of the electric switch (18, 19), the sensor part (12) has a spring element (30), which carries the movable switch element (182 or 192) or acts upon the movable switch element (182 or 192) and which on one end is spatially fixed and crosswise to the direction of motion (16, 17) of the encoder part (11) is elastically deflectable to close or open the electric switch (18, 19), and that the indexing members (21) on the encoder part (11) are provided with a deflection chamfer (221 or 222), inclined relative to the direction of motion (16, 17) of the encoder part (11), which cooperate with the spring element (30) for its deflection, on each side of the path of motion of the encoder part (11) there is one electric switch (18 and 19, respectively), and that each indexing member (21) on the encoder part (11) has two parallel deflection chamfers (21, 22), inclined relative to the direction of motion, each of which at one end changes over into a respective indexing plateau (223, 224) that is parallel to the direction of motion (16 or 17) of the encoder part (11).

16. An incremental travel encoder comprising a movable encoder part (11) and a stationary sensor part (12), along which the encoder part (11) can be moved past in increments, and one electrical counting pulse can be picked up from each increment of the encoder part (11), in which the sensor part (12) has at least one electric switch (18, 19) with one fixed and one movable switch element (181, 191 and 182, 192), respectively for opening and closing a circuit for generating counting pulses; the encoder part (11) has a plurality of indexing members (21), which are disposed one after the other at the spacing of an increment in the direction of motion (16, 17) of the encoder part and upon each increment of the encoder part (11) actuate the movable switch element (182 or 192) in the sense of a temporary opening or closure of the electric switch (18, 19) the sensor part (12) has a spring element (30), which carries the movable switch element (182 or 192) or acts upon the movable switch element (182 or 192) and which on one end is spatially fixed and crosswise to the direction of motion (16, 17) of the encoder part (11) is elastically deflectable to close or open the electric switch (18, 19), and that the indexing members (21) on the encoder part (11) are provided with a deflection chamfer (221 or 222), inclined relative to the direction of motion (16, 17) of the encoder part (11), which cooperates with the spring element (30) for its deflection, the encoder part (11) is embodied as a control wheel (14) rotatable about a pivot axis (13); that the deflection chamfers (221, 222) are embodied with an indexing plateau (223, 224) on a face end (142) of the control wheel (14); and that the spring element (30) is oriented radially to the pivot axis (13) of the control wheel (14) and is embodied as deflectable in the direction of the pivot axis (13) of the control wheel (14).

17. A travel encoder in accordance with claim 16, in which the deflection chamfers (221, 222) with the indexing plateau (223, 224) are embodied on indexing protrusions (22), which are formed integrally on the control wheel (14).

18. A travel encoder in accordance with claim 16, in which the spring element (30) comprises electrically conductive material and forms the movable switch element or elements themselves, and that a slide piece (26) protruding into the toothing (23) and comprising insulating material is mounted on the free end of the spring element (30).

19. An incremental travel encoder comprising a movable encoder part (11) and a stationary sensor part (12), along which the encoder part (11) can be moved past in increments, and one electrical counting pulse can be picked up from each increment of the encoder part (11), in which the sensor part (12) has at least one electric switch (18, 19) with one fixed and one movable switch element (181, 191 and 182, 192), respectively for opening and closing a circuit for generating counting pulses; the encoder part (11) has a plurality of indexing members (21), which are disposed one after the other at the spacing of an increment in the direction of motion (16, 17) of the encoder part and upon each increment of the encoder part (11) actuate the movable switch element (182 or 192) in the sense of a temporary opening or closure of the electric switch (18, 19), the sensor part (12) has a spring element (30), which carries the movable switch element (182 or 192) or acts upon the movable switch element (182 or 192) and which on one end is spatially fixed and crosswise to the direction of motion (16, 17) of the encoder part (11) is elastically deflectable to close or open the electric switch (18, 19), and that the indexing members (21) on the encoder part (11) are provided with a deflection chamfer (221 or 222), inclined relative to the direction of motion (16, 17) of the encoder part (11), which cooperate with the spring element (30) for its deflection, the encoder part (11) is embodied as a control wheel (14) rotatable about a pivot axis (13); that the deflection chamfers (221, 222) are embodied with an indexing plateau 223, 224) disposed along a circular path on one of the two disk faces (143, 144) of the control wheel (14); and that the spring element (30) is oriented parallel to the pivot axis (13) of the control wheel (14) and is embodied as deflectable in the circumferential direction of the control wheel (14).

20. A travel encoder in accordance with claim 19, in which the deflection chamfers (221, 222) with the indexing plateau (223, 224) are embodied on indexing protrusions (22), which are formed integrally on the control wheel (14).

21. An incremental travel encoder comprising a movable encoder part (11) and a stationary sensor part (12), along which the encoder part (11) can be moved past in increments, and one electrical counting pulse can be picked up from each increment of the encoder part (11), in which the sensor part (12) has at least one electric switch (18, 19) with one fixed and one movable switch element (181, 191 and 182, 192), respectively for opening and closing a circuit for generating counting pulses; the encoder part (11) has a plurality of indexing members (21), which are disposed one after the other at the spacing of an increment in the direction of motion (16, 17) of the encoder part and upon each increment of the encoder part (11) actuate the movable switch element (182 or 192) in the sense of a temporary opening or closure of the electric switch (18, 19), the sensor part (12) has a spring element (30), which carries the movable switch element (182, 192) or acts upon the movable switch element (182, 192) and which on one end is spatially fixed and in the direction of motion of the encoder part (11) is elastically deflectable to close or open the electric switch (18, 19), and that the indexing members (21) on the encoder part (11) are formed by teeth (231) of a toothing (23) into which the spring element (30) protrudes with its free end, and upstream and downstream, in terms of the direction of motion (16, 17) of the encoder part (11), of the spring element (30), one electric switch (18, 19), is disposed, and that the teeth (231) of the toothing (23) are embodied symmetrically, with identical leading and trailing edges.

22. A travel encoder in accordance with claim 21, in which the encoder part (11) is embodied as a control wheel (14); that the toothing is disposed as a tooth ring, coaxial to the pivot axis (13) of the control wheel (14), with axially protruding teeth on one of the plane disk faces (143, 144) of the control wheel (14), and that the spring element (30) is oriented parallel to the pivot axis (13) of the control wheel (14).

23. A travel encoder in accordance with claim 22, in which the spring element (30) comprises electrically conductive material and forms the movable switch element or elements themselves, and that a slide piece (26) protruding into the toothing (23) and comprising insulating material is mounted on the free end of the spring element (30).

* * * * *